(12) United States Patent
Chen et al.

(10) Patent No.: US 8,331,083 B2
(45) Date of Patent: Dec. 11, 2012

(54) BATTERY ASSEMBLY FOR PORTABLE ELECTRONIC DEVICE

(75) Inventors: Bao-Jiang Chen, Shenzhen (CN); De-Lin Li, Shenzhen (CN); Peng Jiang, Shenzhen (CN); Guan-Yu Zhou, Shenzhen (CN); Yue-Sheng Zhang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 832 days.

(21) Appl. No.: 12/485,128

(22) Filed: Jun. 16, 2009

(65) Prior Publication Data
US 2010/0124695 A1    May 20, 2010

(30) Foreign Application Priority Data
Nov. 14, 2008  (CN) .......................... 2008 1 0305556

(51) Int. Cl.
*G06F 1/16* (2006.01)
(52) U.S. Cl. .................. 361/679.1; 429/550.1; 455/572; 396/268
(58) Field of Classification Search ............ 429/97, 429/175, 100, 176, 96, 550.1; 361/600, 700, 361/752, 809, 679.1, 679.56, 679.09, 679.2, 361/679.27, 679.08, 679.21, 679.3, 679.23, 361/679.55; 455/575.1, 575.8, 575.4, 572, 455/566, 575.3, 66.1; 345/156, 163, 168; 396/80, 100, 233, 268; 348/42, 53, 56; 439/136, 439/500
See application file for complete search history.

(56) References Cited

U.S. PATENT DOCUMENTS

| | | | |
|---|---|---|---|
| 8,247,110 B2* | 8/2012 | Li ................................. | 429/175 |
| 2004/0209659 A1 | 10/2004 | Sun et al. | |
| 2006/0139856 A1* | 6/2006 | Liu et al. ....................... | 361/600 |
| 2010/0104931 A1* | 4/2010 | Zuo et al. ........................ | 429/97 |
| 2010/0136395 A1* | 6/2010 | Lu et al. .......................... | 429/97 |

\* cited by examiner

*Primary Examiner* — Hung Duong
(74) *Attorney, Agent, or Firm* — Altis Law Group, Inc.

(57) ABSTRACT

A battery cover assembly is using for accommodating a battery therein. The battery cover assembly comprises a housing, a battery cover, and a elastic member. The housing has a depressed portion, a space and a latching trough defined therein. The depressed portion is configured for accommodating the battery therein. The battery cover is configured for covering the depressed portion of the housing. The battery cover has a shaft and a latching portion protruding therefrom. The shaft is corresponding to the space of the housing. The shaft is rotatably held in the space to rotatably latching the battery cover with the housing. The latching portion is corresponding to the latching trough of the housing. The latching portion is latched within the latching trough. The elastic member is fixed between the housing and the battery cover. The elastic member provides an elastic force for rotating the battery cover relative to the housing.

18 Claims, 5 Drawing Sheets

BATTERY ASSEMBLY FOR PORTABLE ELECTRONIC DEVICE

BACKGROUND

1. Technical Field

The present invention generally relates to battery assemblies, and particularly to battery assemblies used in portable electronic devices.

2. Description of Related Art

Portable electronic devices usually include latch mechanisms for latching battery covers to housings. The latch mechanisms must tolerate frequent installation and removal of batteries relative to the housing.

A typical battery cover latch mechanism includes a battery cover and a housing. The battery cover may slide relative to and then latch with the housing by a sliding-type structure. However, the battery cover is typically completely removed from the housing for installation or removal of the battery. Thus, the loss of the battery cover after removal can be a risk.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the exemplary battery assembly and portable electronic device using the battery assembly. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
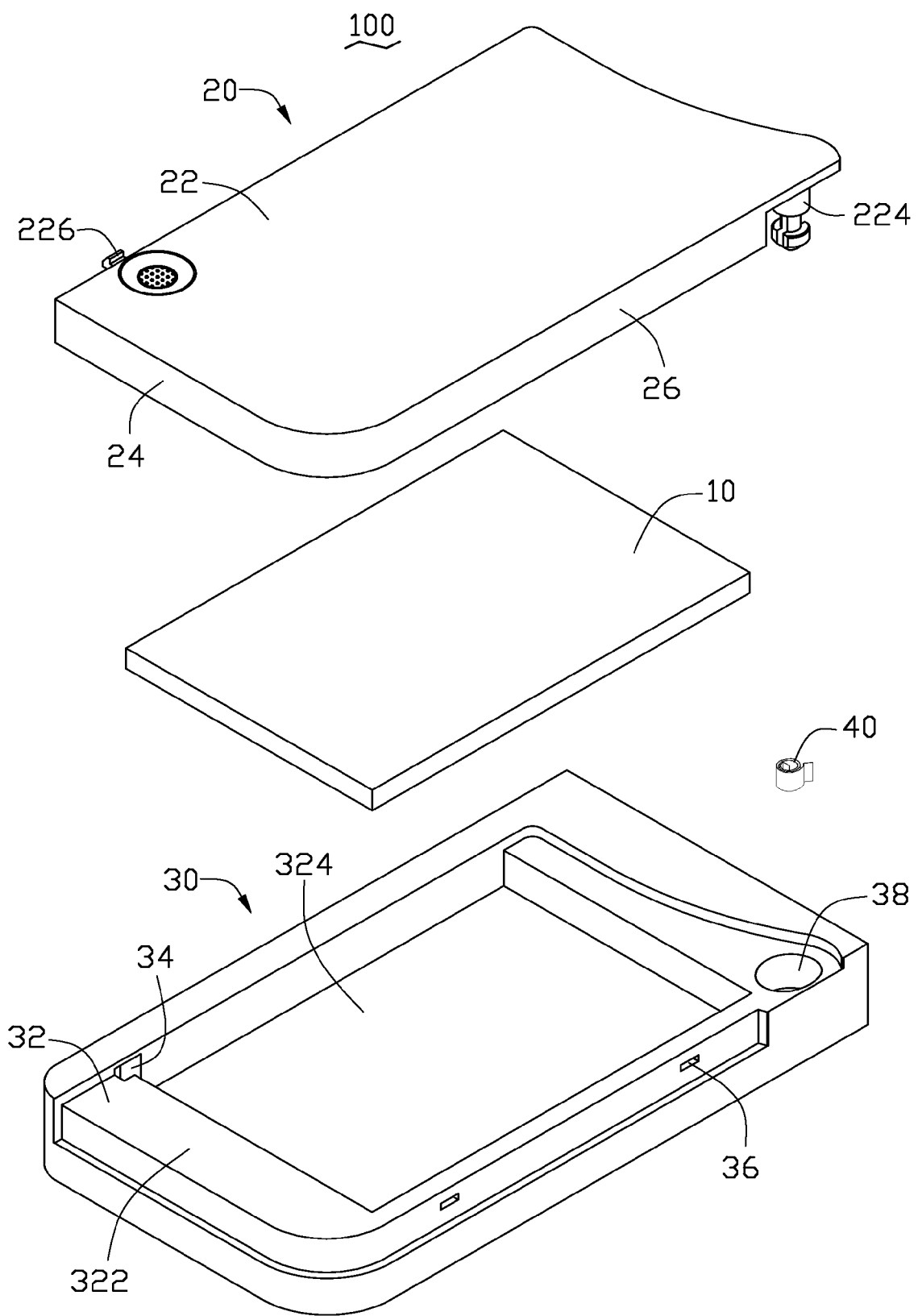
FIG. 1 is an exploded, isometric view of one embodiment of a battery assembly used for holding a battery therein, the battery assembly including a battery cover, a housing and an elastic member.

Referring to FIG. 1, an exemplary embodiment of a battery cover assembly 100 used in a portable electronic device such as a mobile phone is shown. The battery cover assembly 100 is used for receiving a battery 10. The battery cover assembly 100 includes a battery cover 20, a housing 30, and an elastic member 40 rotatably coupling the battery cover 20 and housing 30 together.

Figure 2:
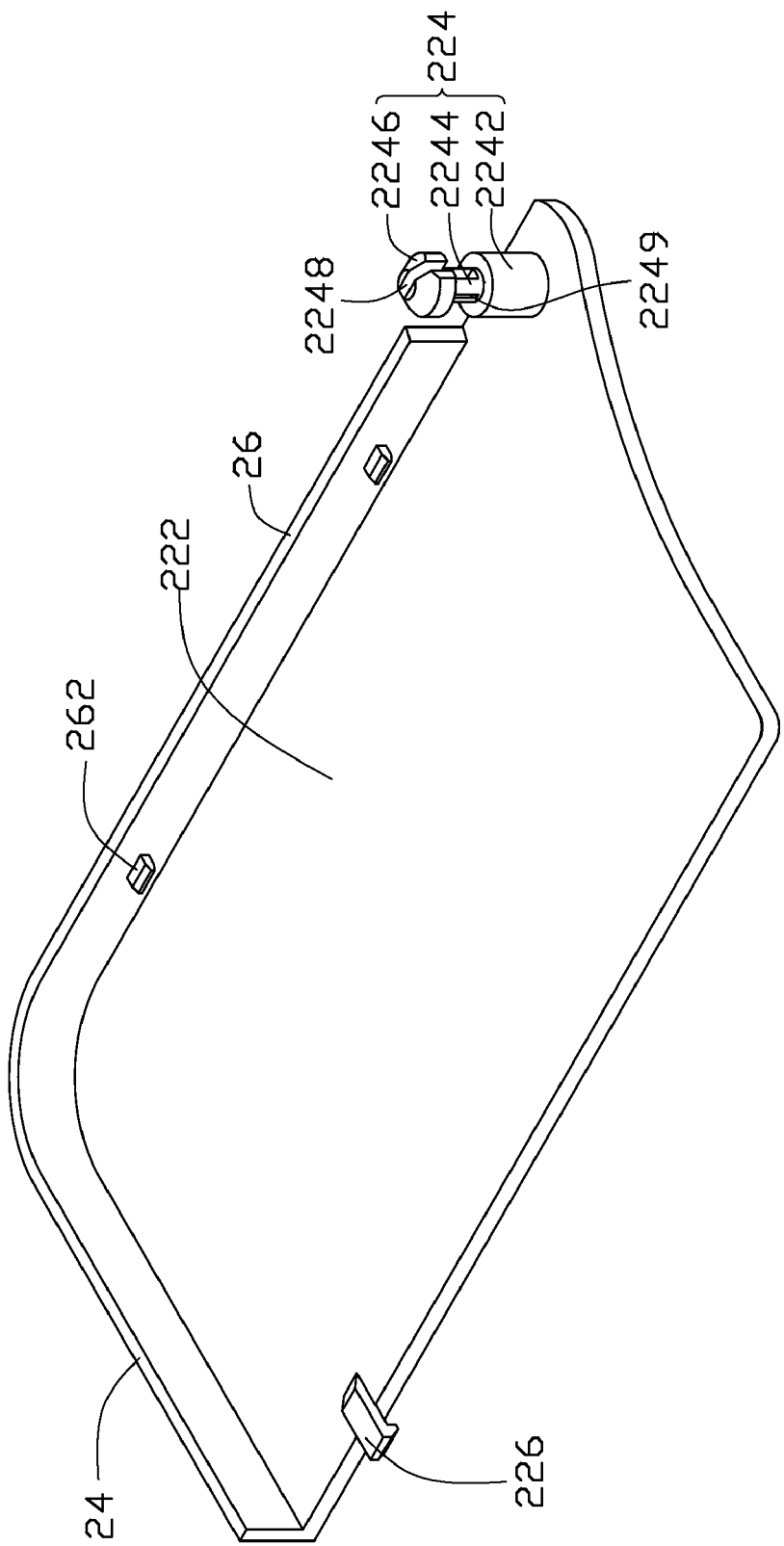
FIG. 2 is similar to FIG. 1, but showing the battery assembly in an another view.

Referring also to FIG. 2, the battery cover 20 includes a bottom wall 22 and two sidewalls protruding from one surface of the bottom wall 22. The sidewalls include a first sidewall 24 located at one end of the bottom wall 22 and a second sidewall 26 located at one side of the bottom wall 22 to connect with the first sidewall 24. The bottom wall 22 has a shaft 224 located opposite to the first sidewall 24 and a latching portion 226 located opposite to the second sidewall 26. The latching portion 226 extends out of the bottom wall 22 and is used to latch with the housing 30. The second sidewall 26 has a plurality of locating portions 262 protruding therefrom. The locating portions 262 are configured for facilitating the battery cover 20 precisely assembled to the housing 30.

The shaft 224 includes a first pole 2242 protruding from the bottom wall 22 of the battery cover 20, a second pole 2244 extending from a distal end of the first pole 2242 and a third pole 2246 extending from a distal end of the second pole 2244. The first pole 2242, the second pole 2244 and the third pole 2246 are all substantially co-linear. However, the diameters of the first pole 2242 and the third pole 2246 are larger than the diameter of the second pole 2244.

The shaft 224 has a slit 2248 defined in the distal end of the third pole 2246 and extending to a joint, where the second pole 2244 and the first pole 2242 join together. As a result, the shaft 224 can compressed when the shaft 224 is pressed. The second pole 2244 has a slot 2249 defined to fix one end of the elastic member 40.

Figure 3:
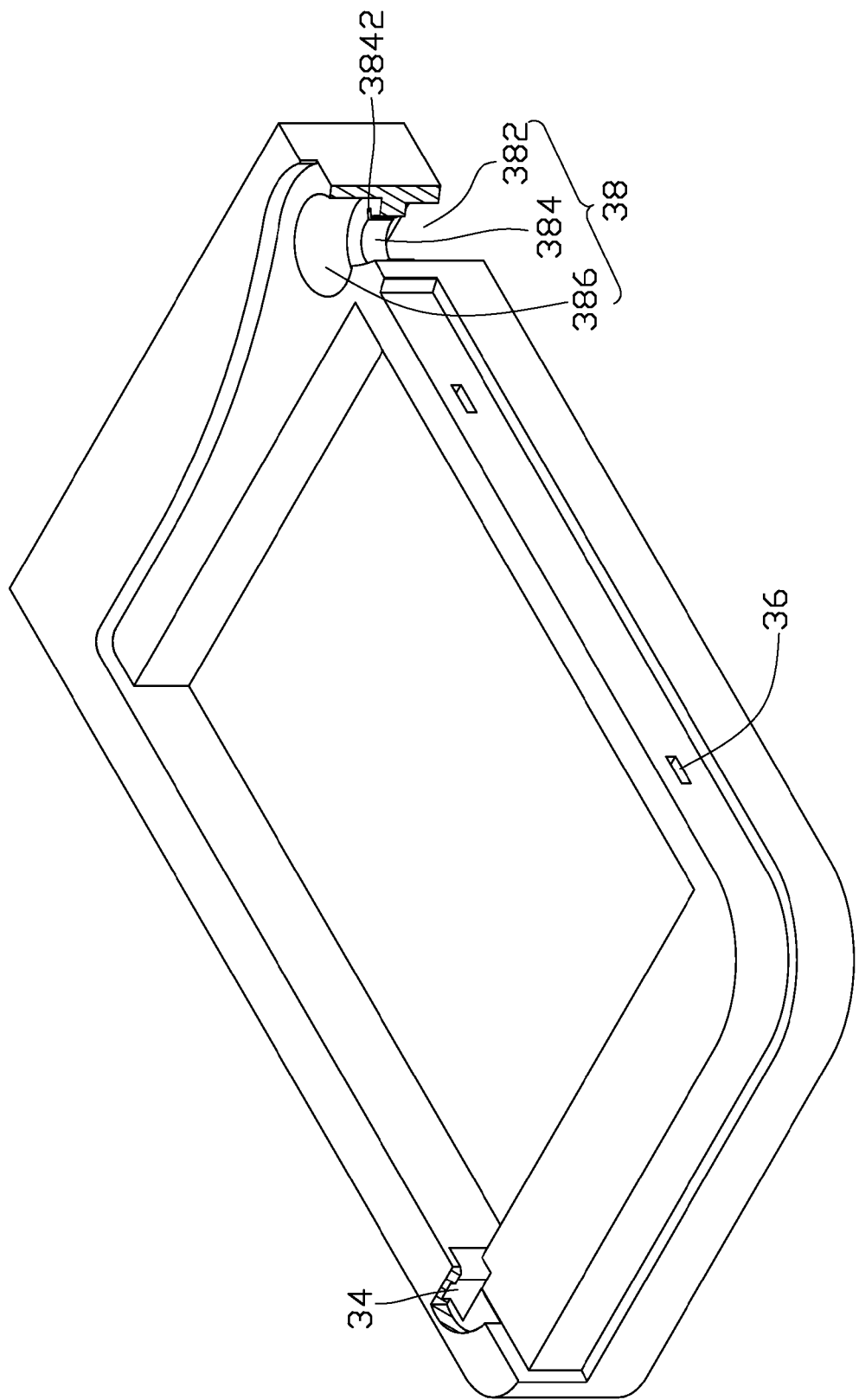
FIG. 3 is a partially cutaway view of the housing shown in FIG. 1.

Referring to FIGS. 1 and 3, the housing 30 is substantially rectangular and defines a receiving groove 32 for accommodating the battery cover 20, and a footwall 322 is defined in the receiving groove 32. The footwall 322 has a depressed portion 324 defined therein for accommodating the battery 10. The housing 30 has a latching trough 34 defined correspondingly to the latching portion 226 of the battery cover 20. The latching portion 226 is accommodated in the latching trough 34 to latching the battery cover 20 with the housing 30.

The housing 30 defines a plurality of locating holes 36 corresponding to the locating portions 262 of the battery cover 20, correspondingly. The locating holes 36 are configured for accommodating the locating portions 262 therein, and facilitating the battery cover 20 precisely assembled to the housing 30.

As shown in FIG. 3, the housing 30 defines a space 38 for corresponding to the shaft 224 of the battery cover 20. The space 38 includes a first opening 382, a second opening 384 communicating with the first opening 382 and a third opening 386 communicating with the second opening 384. The first opening 382 has the same shape and size as the first pole 2242 of the shaft 224. The first opening 382 is used for rotatably accommodating the first pole 2242 therein. The second opening 384 has the same shape and size as the second pole 2244, but slightly smaller than the first pole 2242 and the third pole 2246. The second opening 384 is used for rotatably accommodating the second pole 2244 therein. The third opening 386 has the same shape and size as the third pole 2246. The third opening 386 is used for rotatably accommodating the third pole 2246 therein. The housing 30 further has a notch 3842 defined in the inner wall of the second opening 384. The notch 3842 is configured to fix another end of the elastic member 40.

The elastic member 40 provides an elastic force for the battery cover 20 relative to the housing 30. The elastic member 40 may be a coil spring. One end of the elastic member 40 is fixed to the shaft 224, and another end of the elastic member 40 is fixed to the housing 30.

Figure 4:
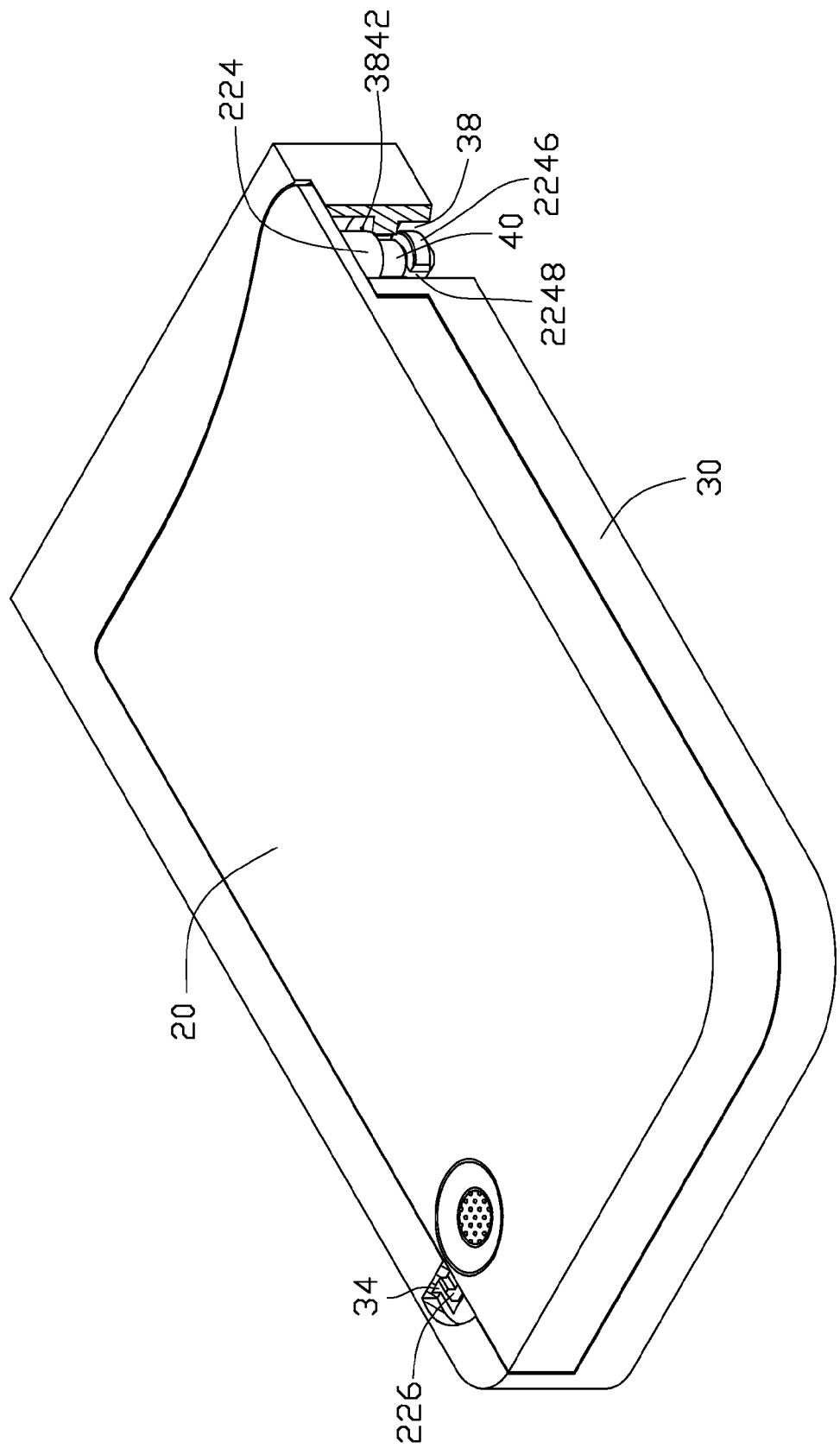
FIG. 4 is an assembled and partially cutaway view of the battery assembly shown in FIG. 1.
Figure 5:
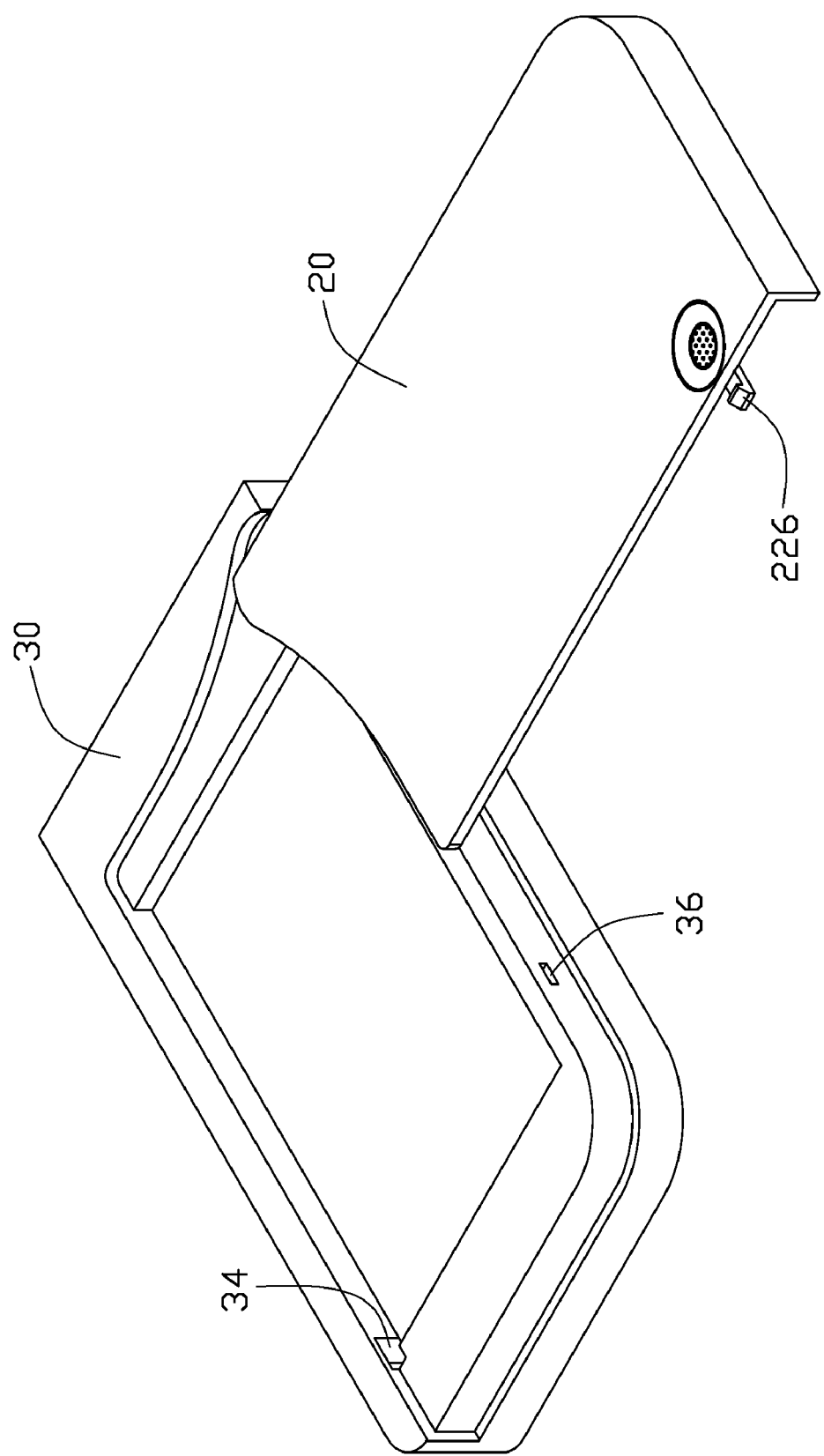
FIG. 5 is similar to FIG. 4, but showing the battery assembly in an opened position.

Referring to FIGS. 4 to 5, to assemble the battery cover assembly 100, first, one end of the elastic member 40 is received and fixed into the slot 2249 of the second pole 2244. Then, the elastic member 40 is coiled on the second pole 2244. Next, the shaft 224 is aligned with the space 38 of the housing 30, and another end of the elastic member 40 is aligned with the notch 3842 in the second opening 384.

After that, the battery cover 20 is pressed toward the housing 30 to accommodate the shaft 224 of the battery cover 20 in the space 38 of the housing 30. At this stage, because the third pole 2246 is larger than the second opening 384, and the slit 2248 is defined in the second pole 2244, the side wall of the second opening 384 biases the third pole 2246 so that the second pole 2244 is compressed until the third pole 2246 passes through the second opening 384.

Once the third pole 2246 passes through the second opening 384, the third pole 2246 restores to its original state and is accommodated in the third opening 386. At this time, the first pole 2242 is accommodated in the first opening 382, the second pole 2244 is accommodated in the second opening 384, another end of the elastic member 40 is accommodated in the notch 3842 in the second opening 384. The first pole 2242 and the third pole 2246, both of which are larger than the second opening 384, thus a holding engagement may occur between the first pole 2242 and the third to fix the shaft 224 to the housing 30.

Then, the battery cover 20 is rotated relative to housing 30 about the shaft 224 until the latching portion 226 of the battery cover 20 is latched into the latching trough 34 of the housing 30 and the locating poles of the battery cover 20 are accommodated in the locating holes 36 of the housing 30, i.e., yield to the battery cover assembly 100 (seen in FIG. 4). At this stage, the elastic member 40 is distorted to accumulate elastic force.

When removing the battery 10 from the first housing 30, first, the area of the battery cover 20 aligned with the latching portion 226, is pressed to release the latching portion 226 from the latching trough 34. Then, the battery cover 20 rotates relative to the housing 30 under the accumulated elastic force of the elastic member 40 until the depressed portion 324 of the housing 30 is exposed, such that the battery 10 can be removed.

Because the battery cover 20 is rotatably fixed to the housing 30, and the battery cover 20 is not required to be completely removed from the housing 30 for installation or removal of battery 10. Thus the loss of the battery cover 20 after removal can be avoided.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover assembly using for accommodating a battery therein, the battery cover assembly comprising:
   a housing having a depressed portion, a space and a latching trough defined therein, the depressed portion being configured for accommodating the battery therein;
   a battery cover being configured for covering the depressed portion of the housing, the battery cover having a shaft and a latching portion protruding therefrom, the shaft corresponding to the space of the housing, the shaft being rotatably held in the space to rotatably latch the battery cover with the housing, the latching portion corresponding to the latching trough of the housing, the latching portion for latching within the latching trough;
   an elastic member being fixed between the housing and the battery cover, the elastic member providing an elastic force for rotating the battery cover relative to the housing.

2. The battery cover assembly of claim 1, wherein the battery cover includes a bottom wall, the latching portion and the shaft protrude from the bottom wall.

3. The battery cover assembly of claim 2, wherein the shaft includes a first pole protruding from the bottom wall, a second pole extending from a distal end of the first pole, a third pole extending from a distal end of the second pole, the first pole, the second pole and the third pole are all substantially co-linear, but the diameters of the first pole and the third pole are larger than the diameter of the second pole, the space has the same shape and size as the shaft.

4. The battery cover assembly of claim 3, wherein the space includes a first opening, a second opening communicating with the first opening and a third opening communicating with the second opening, the first opening has the same shape and size as the first pole, the first opening is used for rotatably accommodating the first pole therein, the second opening has the same shape and size as the second pole, the second opening is used for rotatably accommodating the second pole therein, the third opening has the same shape and size as the third pole, the third opening is used for rotatably accommodating the third pole therein.

5. The battery cover assembly of claim 4, wherein the second pole has a slot defined therein for fixing one end of the elastic member therein, the housing has a notch defined in the inner wall of the second opening for fixing another end of the elastic member therein.

6. The battery cover assembly of claim 3, wherein the shaft has a slit defined therein such that the shaft be capable of being compressed.

7. The battery cover assembly of claim 6, wherein the second sidewall has a plurality of locating portions protruding therefrom, the housing has a plurality of locating holes corresponding to the locating portions, the locating portions are accommodated in the locating holes, correspondingly.

8. The battery cover assembly of claim 2, wherein the battery cover further includes a first sidewall located at one end of the bottom wall and a second sidewall located one side of the bottom wall, the shaft is located opposite to the first sidewall, the latching portion is located opposite to the second sidewall.

9. The battery cover assembly of claim 1, wherein the elastic member is a coil spring.

10. The portable electronic device of claim 1, wherein the elastic member is a coil spring.

11. A portable electronic device, comprising:
    a battery;
    a housing having a depressed portion, a space and a latching trough defined therein, the depressed portion being configured for accommodating the battery therein;
    a battery cover being configured for covering the depressed portion of the housing, the battery cover having a shaft and a latching portion protruding therefrom, the shaft corresponding to the space of the housing, the shaft being rotatably hold in the space to rotatably latching the battery cover with the housing, the latching portion corresponding to the latching trough of the housing, the latching portion for latching within the latching trough;
    an elastic member being fixed between the housing and the battery cover, the elastic member providing an elastic force for rotating the battery cover relative to the housing.

12. The portable electronic device of claim 11, wherein the battery cover includes a bottom wall, the latching portion and the shaft both of which are protruding from the bottom wall.

13. The portable electronic device of claim 12, wherein the shaft includes a first pole protruding from the bottom wall, a second pole extending from a distal end of the first pole, a third pole extending from a distal end of the second pole, the first pole, the second pole and the third pole are all substantially a column, but the diameters of the first pole and the third pole are larger than the diameter of the second pole, the space has the same shape and size as the shaft.

14. The portable electronic device of claim 13, wherein the space includes a first opening, a second opening communicating with the first opening and a third opening communicating with the second opening, the first opening has the same shape and size as the first pole, the first opening is used for rotatably accommodating the first pole therein, the second opening has the same shape and size as the second pole, the second opening is used for rotatably accommodating the second pole therein, the third opening has the same shape and size as the third pole, the third opening is used for rotatably accommodating the third pole therein.

15. The portable electronic device of claim 14, wherein the second pole has a slot defined therein for fixing one end of the elastic member therein, the housing has a notch defined in the inner wall of the second opening for fixing another end of the elastic member therein.

16. The portable electronic device of claim 13, wherein the shaft has a slit defined therein such that the shaft be capable of being compressed.

17. The portable electronic device of claim 16, wherein the second sidewall has a plurality of locating portions protruding therefrom, the housing has a plurality of locating holes corresponding to the locating portions, the locating portions are accommodated in the locating holes, correspondingly.

18. The portable electronic device of claim 12, wherein the battery cover further includes a first sidewall located at one end of the bottom wall and a second sidewall located one side of the bottom wall, the shaft is located opposite to the first sidewall, the latching portion is located opposite to the second sidewall.

* * * * *